United States Patent
Kuhlman et al.

(10) Patent No.: US 8,408,765 B2
(45) Date of Patent: Apr. 2, 2013

(54) LIGHT DISTRIBUTION PATTERN CONTROL USING OBJECT DETECTION AND ELECTROWETTING LENSES

(75) Inventors: Frederick F. Kuhlman, Kokomo, IN (US); Dwadasi H. R. Sarma, Kokomo, IN (US); Nasser Lukmani, West Bloomfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 102 days.

(21) Appl. No.: 13/106,402

(22) Filed: May 12, 2011

(65) Prior Publication Data
US 2012/0287493 A1    Nov. 15, 2012

(51) Int. Cl.
*B60Q 1/00* (2006.01)
(52) U.S. Cl. ......... 362/488; 362/464; 362/465; 362/276
(58) Field of Classification Search ................. 362/545, 362/488, 464, 465, 276, 802
See application file for complete search history.

(56) References Cited

U.S. PATENT DOCUMENTS

| | | | |
|---|---|---|---|
| 7,339,575 B2 * | 3/2008 | Tai et al. ...................... | 345/166 |
| 2008/0158360 A1 | 7/2008 | Katou et al. | |
| 2008/0205075 A1 * | 8/2008 | Hikmet et al. ................ | 362/488 |
| 2011/0115385 A1 * | 5/2011 | Waumans et al. ............. | 315/152 |

OTHER PUBLICATIONS

Smith, et al: "Agile wide-angle beam steering with electrowetting microprisms", vol. 14, No. 14/Optics Express 6557, Jul. 10, 2006, 7 pages.
Technical Disclosure "Adjustable car headlights using electrowetting lens", Disclosed Anonymously, Nov. 29, 2005, 4 pages, IP.com No. IPCOM000132016D, www.ip.com.
Smith, et al.; "Agile wide-angle beam steering with electrowetting microprisms", vol. 14, No. 14/Optics Express 6557, Jul. 10, 2006, 7 pages.
Heikenfeld, Jason, "Electrowetting optics on target for record optical performance", SPIE Newsroom 10.117/2.1200802.1017, 2008, 2 pages.

* cited by examiner

*Primary Examiner* — Bao Q Truong
(74) *Attorney, Agent, or Firm* — Lawrence D. Hazelton

(57) ABSTRACT

A system, controller, and method for controlling a light distribution pattern. A light source and an electrowetting lens cooperate to vary a light distribution pattern of light from the light source. An object detector is used by a controller determine the location of an object and operate the electrowetting lens in order to control the light distribution pattern based on the location of the object. The electrowetting lens provides for faster redirecting of light toward an object when compared to mechanical based system. The light source may be an array of light emitting diodes to provide a reliable, energy efficient source of light.

7 Claims, 4 Drawing Sheets

LIGHT DISTRIBUTION PATTERN CONTROL USING OBJECT DETECTION AND ELECTROWETTING LENSES

TECHNICAL FIELD OF INVENTION

The invention generally relates to controlling a light distribution pattern of light from a light source, and more particularly relates to controlling that light distribution pattern based on an indication of an object in or near an area potentially illuminated by the light.

BACKGROUND OF INVENTION

It is desirable to have sufficient illumination of an object or location being viewed by a person. Some light sources provide illumination that may be unnecessarily widespread and so some of the energy used to generate that widespread light is wasted. One solution is to provide focused light source instead of, or in addition to, the widespread light source a light so the type of light desired can be selected. Reflectors, shrouds, and/or glass lenses may be used to adjust the light distribution pattern of light from widespread to focused, but making such adjustments may be inconvenient and/or unsafe depending on the situation.

Some vehicle manufacturers offer directional headlights having variable light distribution patterns that can be adjusted to light along an intended travel path, for example that direct light away from straight ahead as the vehicle is navigating a corner. However, mechanical system to adjust these directional headlights may be slow to respond to sudden changes in the desired light distribution pattern, and are generally limited to being adjusted in response to changes in steering wheel angle and so can not 'look ahead' to make adjustments prior to entering the corner.

SUMMARY OF THE INVENTION

In accordance with one embodiment of this invention, a system for controlling a light distribution pattern is provided. The system includes a light source, an electrowetting lens, an object detector, and a controller. The light source is operable to emit light. The electrowetting lens is operable to vary a light distribution pattern of light from the light source into an area. The object detector is configured to indicate a location of an object. The controller is configured to operate the electrowetting lens in order to control the light distribution pattern into the area based on the location of the object indicated by the object detector.

In another embodiment of the present invention, a controller for a light distribution pattern control system configured to illuminate an area is provided. The controller includes an output and an input. The output is configured for outputting a control signal to an electrowetting lens operable to vary a light distribution pattern of light from a light source arriving in the area. The input is configured for receiving a detection signal from an object detector configured to indicate a location of an object. The controller is configured to determine the control signal based on the input signal in order to control the light distribution pattern in the area based on the location of the object indicated by the object detector.

In yet another embodiment of the present invention, a method for controlling a light distribution pattern is provided. The method includes providing a light source operable to emit light. The method further includes providing an electrowetting lens to vary a light distribution pattern of light from the light source arriving in an area. The method further includes detecting a location of an object with an object detector. The method further includes operating the electrowetting lens in order to control the light distribution pattern in the area based on the location of the object indicated by the object detector.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
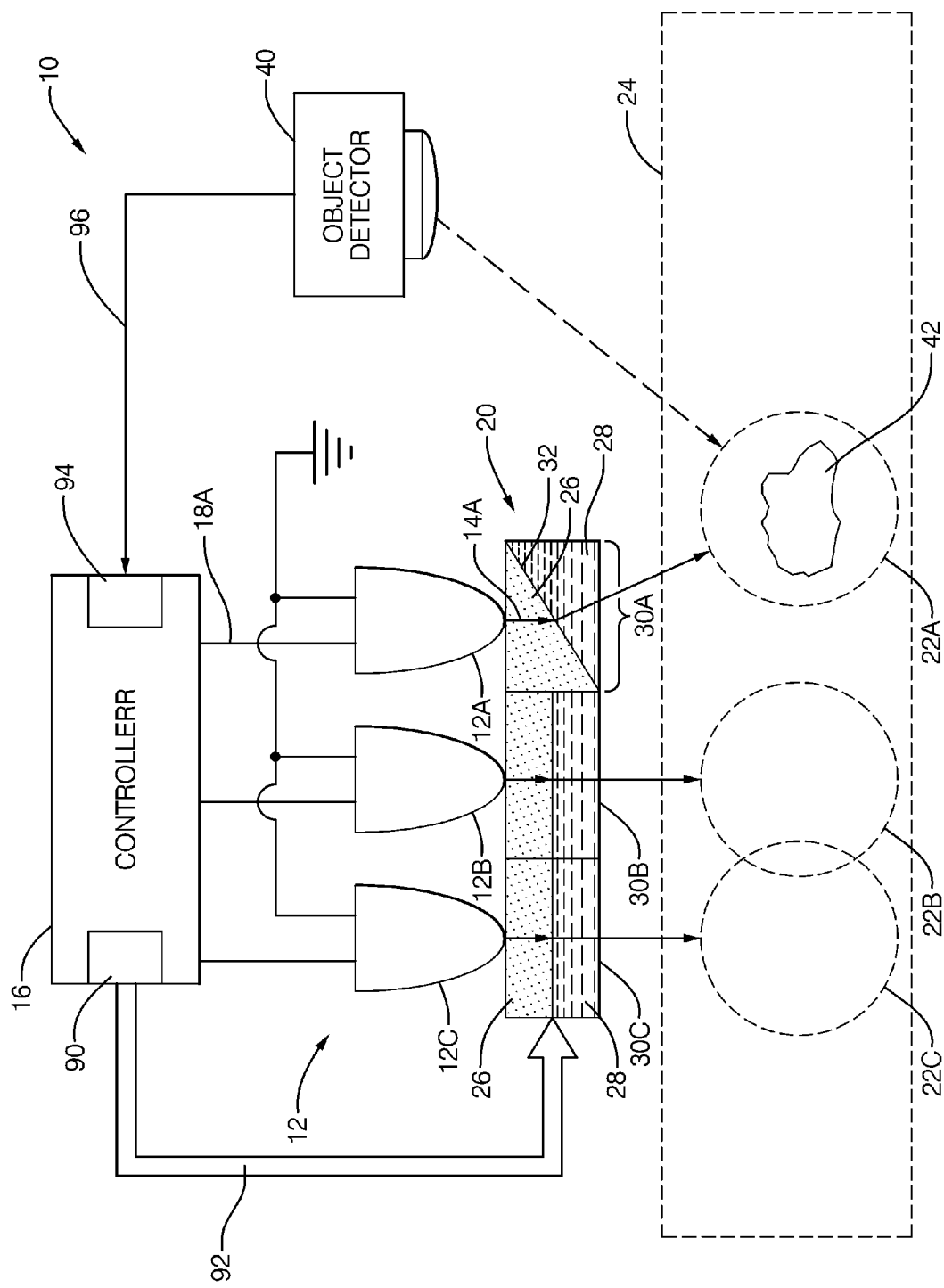
FIG. 1 is a functional diagram of a light control system in accordance with one embodiment.

FIG. 1 illustrates a non-limiting example of a system 10 for controlling a light distribution pattern. The system 10 generally includes a light source 12A operable to emit light as indicated by arrow 14A, hereafter sometimes light 14A. The light source 12A may be any kind source of light, for example incandescent, fluorescent, or a light emitting diode (LED). Preferably, light emitted by the light source 12A is directed or focused in a particular direction as suggested by the arrow 14A; however an omnidirectional type light source may be used. The light source 12A may be connected to a controller 16, or the like, via a light source connection 18A so that the controller 16 can operate the light source to be OFF, and so not emit light, or ON, and so emit light.

The system 10 may include an electrowetting lens 20 operable to vary a light distribution pattern 22A of light from the light source 12A into an area 24. In general, electrowetting lenses, also known as liquid lenses, contain two fluids: an aqueous fluid, commonly referred to as the water layer and indicated as water 26; and a hydrophobic dielectric fluid, commonly referred to as the oil layer and indicated as oil 28. In general, the shape and/or angle of a water/oil interface 32 can be manipulated by applying a voltage to electrodes arranged about the electrowetting lens 20. If the light 14A is incident on the water/oil interface 32 at a non-normal angle as suggested in FIG. 1, and the water 26 has a different index of refraction than the oil 28, then the light 14A may be refracted and so change direction as illustrated. In the non-limiting example in FIG. 1, the electrowetting lens 20 is illustrated as having three electrowetting prisms 30A, 30B, 30C. It will be recognized that the electrowetting lens 20 may include many more than three electrowetting prisms and the prisms may be arranged in a two-dimensional array.

The system 10 may include an object detector 40 configured to indicate a location of an object 42. The object 42 is illustrated for the purpose of explanation as an irregular shape. The object 42 may be a person, an animal, a vehicle, or any object that may be better identified by controlling light from light source 12A to have a light distribution pattern 22A for illuminating the object 42. The object detector 40 may be any of several suitable devices such as a camera capable of registering visible and invisible light (e.g. infrared light), a electromagnetic wave type radar unit, a laser radar unit, an infrared detector, an ultrasonic transceiver, or any other type of device capable of detecting the presence of an object in or near the area 24.

The controller 16 may include a processor (not shown) such as a microprocessor or other control circuitry as should be evident to those in the art. The controller 16 may include memory (not shown), including non-volatile memory, such as electrically erasable programmable read-only memory (EEPROM) for storing one or more routines, thresholds and captured data. The one or more routines may be executed by the processor to perform steps for processing signals received by the controller 16 and operating the electrowetting lens 20 as described herein. As such, the controller 16 may be configured to operate the electrowetting lens 20 in order to control the size and/or location of an illuminated area such as the light distribution pattern 22A into the area 24 based on the location of the object 42 indicated by the object detector 40. The operation of the system 10 will now be further explained by way of non-limiting examples.

Figure 2:
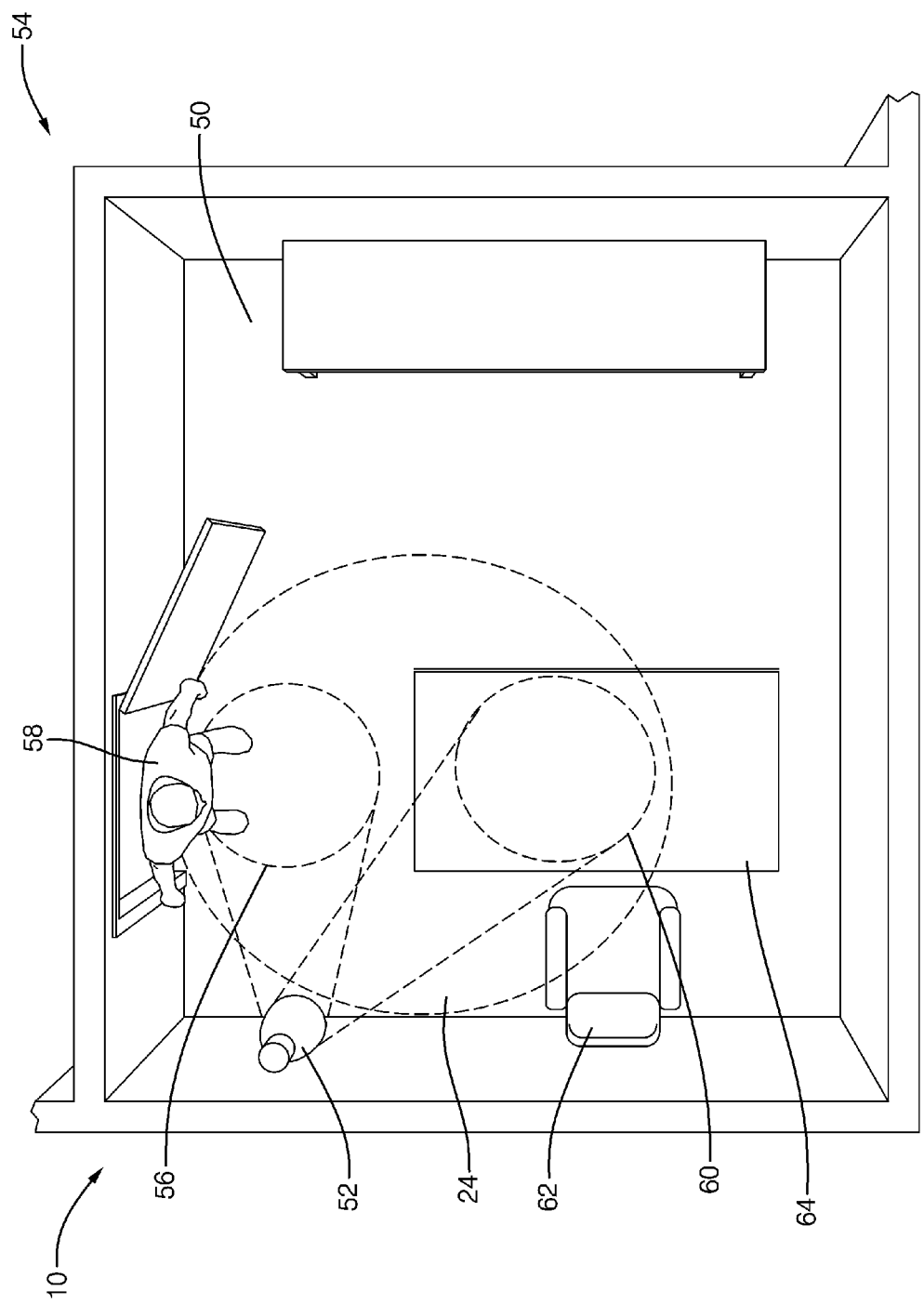
FIG. 2 is a perspective view of an office space equipped with the light control system of FIG. 1 in accordance with one embodiment.

FIG. 2 illustrates a non-limiting example of an office space 50 equipped with an embodiment of the system 10. The system 10 includes a cooperative arrangement of the light source 12 and the electrowetting lens 20 to form a ceiling lamp 52 for the office space 50 that is, for example, part of a building structure 54. Alternatively, the light source 12 and the electrowetting lens 20 may be arranged to form a wall mounted light within the office space 50, a room/reading lamp in a bedroom (not shown), a security light on the exterior of the building structure (not shown), or an automated stage light at a live performance theater (not shown). In the example illustrated in FIG. 2, the ceiling lamp may direct light to a first location 56 within an area 24 when a person 58 approaches the entrance to the office space 50, and then may direct light toward a second location 60 when, for example, the person 58 sits in a chair 62 at a desk 64. In one embodiment, the object detector 40 and the controller 16 are arranged within the assembly forming the ceiling lamp 52. Alternatively, the object detector 40 and the controller 16 may be located elsewhere within the office space 50, with the controller 16 operating a plurality of lights in the office space 50 to optimize light distribution elsewhere in the office space 50. The object detector 40 may suitably use any one of the technologies described above, or may be coupled to pressure sensors (not shown) located in the floor of the office space to determine if a person of object is traveling across the floor.

Another example of how the system 10 could be used is now described, but not illustrated with a drawing. When a person needs guidance from one location to another, for example from one gate in an airport to another gate in an airport, or direct a passenger toward customs, or to retrieve luggage, etc., the system 10 may move the area illuminated in such a manner as to guide the person along a pathway. The system may variably move and/or color light beams to provide guidance that is readily understood by the person. In this example, the object detected by the system is the person being guided, and the light distribution pattern is controlled to guide the person to a particular location.

Figure 3:
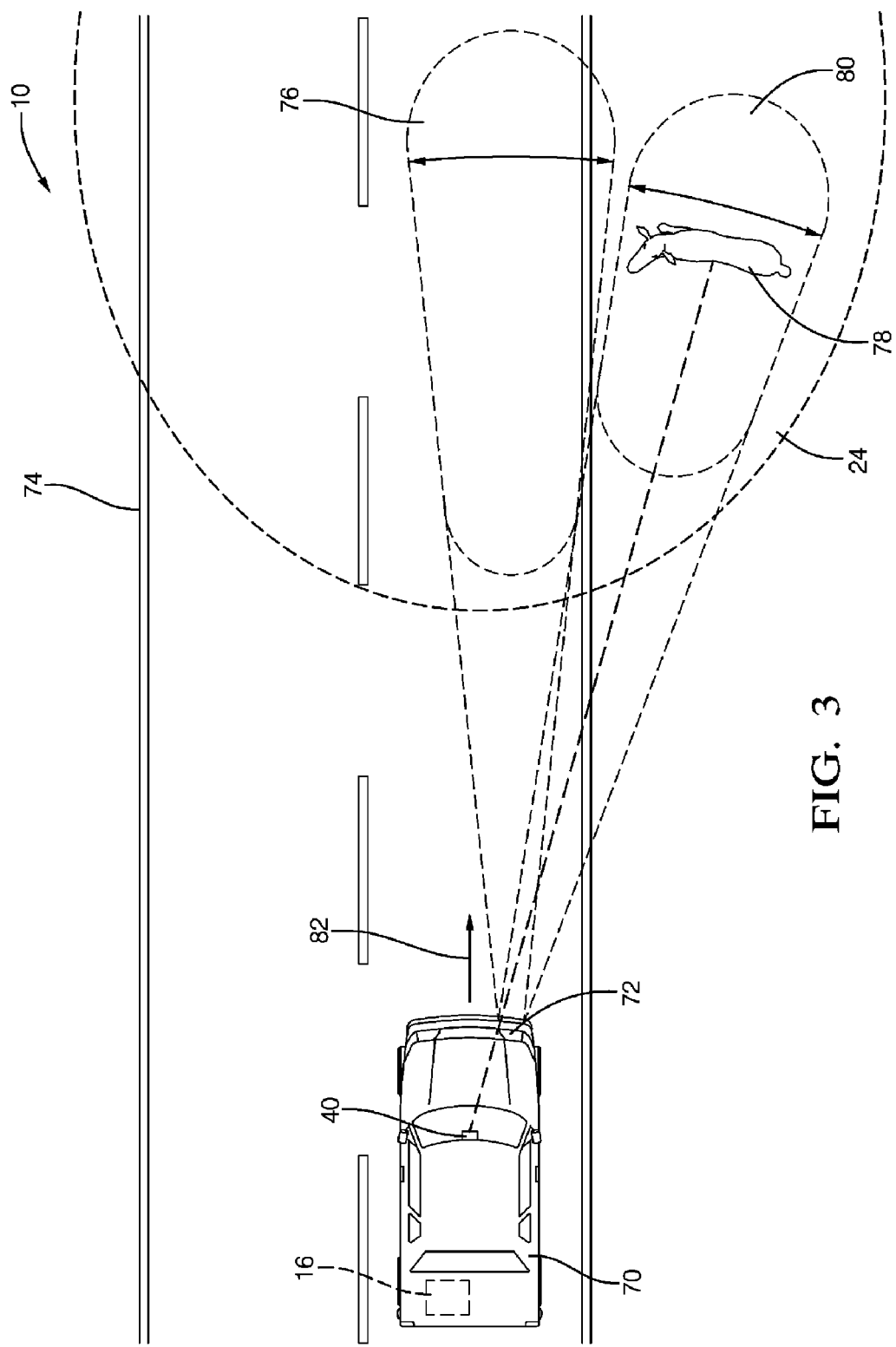
FIG. 3 is a perspective view of a roadway traveled by a vehicle equipped with the light control system of FIG. 1 in accordance with one embodiment.

FIG. 3 illustrates another non-limiting example of a vehicle 70 equipped with the system 10, wherein the light source 12 and the electrowetting lens 20 cooperate to form a headlight 72 for the vehicle 70 to illuminate an area 24 proximate to a roadway 74. For the purpose of simplifying the explanation only one headlight is illustrated as projecting a variable light distribution pattern about the roadway 74 that the vehicle 70 is traveling. However, it is recognized that both headlights may be readily configured to provide independently variable light distribution patterns to illuminate the roadway 74. In this non-limiting example, the object detector 40 is illustrated as being located near a rear-view mirror on the vehicle 70, for example, as part of rear-view mirror assembly that incorporates a forward viewing camera (not shown) for object detection. When no object is detected proximate to the roadway 74 by the object detector 40, the headlight 72 may be operated by the controller 16 to illuminate a first portion 76 of the area 24. However if the object detector 40 detects an object, for example an animal 78 near and/or approaching the roadway 74, the controller 16 may direct light from the headlight 72 to illuminate a second portion 80 of the area 24. Directing light to illuminate the animal 78 may include narrowing the horizontal and vertical spread of light projected by the headlight 72, and may include increasing the intensity of light output by the light source 12. As the vehicle 70 travels in the direction indicated by arrow 82, the system 10 may adaptively change the light distribution pattern projected by the headlight 72 in order to continue directing light toward the animal 78 as the vehicle approaches and eventually passes the animal 78. The controller 16 may also be configured to determine that the animal is moving closer to the roadway 74, and so flash the headlight 72 and/or sound a horn (not shown) on the vehicle 70 in order to alert the animal 78. The object detector 40 may be able to detect objects outside the area 24, and so the controller 16 may be suitably configured to determine if any object is moving toward the area 24.

Another example of how the system 10 could be used is now described, but not illustrated with a drawing. The system 10 may be further configured to headlights on a vehicle such as an automobile or an airplane to indicate to the operator where he/she needs to steer the vehicle. For an automobile, the headlight direction control may be based on information from a Global Positioning System (GPS). For an airplane, the headlight direction control may be based on information received from ground controllers at an airport. In this example, the object detected by the system 10 is the vehicle itself, and so the location of the object is the location of the vehicle (automobile, airplane), and the direction of the headlights is determined based on the location and/or heading of the vehicle, and controlled to guide or direct the vehicle operator.

Referring again to FIG. 1, the system 10 may include a plurality of light sources 12A, 12B, 12C to form a light source 12, for example a plurality of light emitting diodes. Light emitting diodes are generally characterized as having long operating life when compared to other light source technologies. Light emitting diode technology is such that building lighting and vehicle lighting using light emitting diodes is feasible. The system 10 may also include a plurality of electrowetting prisms 30A, 30B, 30C to form the electrowetting lens 20. By aligning each of the plurality of light emitting diodes with each of the electrowetting prisms such that light emitted by a particular light emitting diode is directed toward a particular electrowetting prism, a pattern of light formed by light distribution patterns 22A, 22B, 22C may be varied by the controller 16.

An embodiment of the system 10 may include an object detector 40 that is an optical device, such as a camera. The camera may be configured to detect visible light and or non-visible light such as infrared light. The system 10 may also include infrared illuminators (not shown) to illuminate the area 24, and beyond, so an object outside of the area can be detected. Also, by using an optical device, the degree to which an object is illuminated by the system 10 may be determined so the light distribution pattern may be adjusted accordingly. For example, if the roadway 74 is lined with trees, and an animal 78 approaching the roadway is detected, the controller 16 may be configured to adjust the light distribution pattern based on an illumination level on the object. For example, the system 10 may focus a higher intensity light or different color light on the animal 78 so the animal is more easily identified by an operator of the vehicle 70 against a back drop of vegetation having a similar color/reflectivity characteristic as the animal 78.

Continuing to refer to FIG. 1, the controller 16 may be equipped with an output 90 for outputting a control signal 92 to an electrowetting lens 20 to vary the light distribution patterns 22A, 22B, 22C of light from the light source 12 arriving in the area 24. The control signal 92 may apply voltages to the electrowetting prisms 30A, 30B, and 30C in order to vary the orientation of the interface layer 32 in order to change the direction of the light beam 14A. The controller 16 may also be equipped with an input 94 for receiving a detection signal 96 from the object detector 40. The detection signal 96 may be indicative of a series of images taken by a camera that is part of the object detector 40, and the images may be indicative of a location of the object 42, and that location my be relative to the area 24 or relative to the object detector 40. The controller 16 may also include and/or execute software routines configured to determine the control signal 92 based on the input signal 94 in order to control the light distribution pattern in the area 24 based on the location of the object 42, for example a person 58 or an animal 78 detected and/or indicated by the object detector 40.

Figure 4:
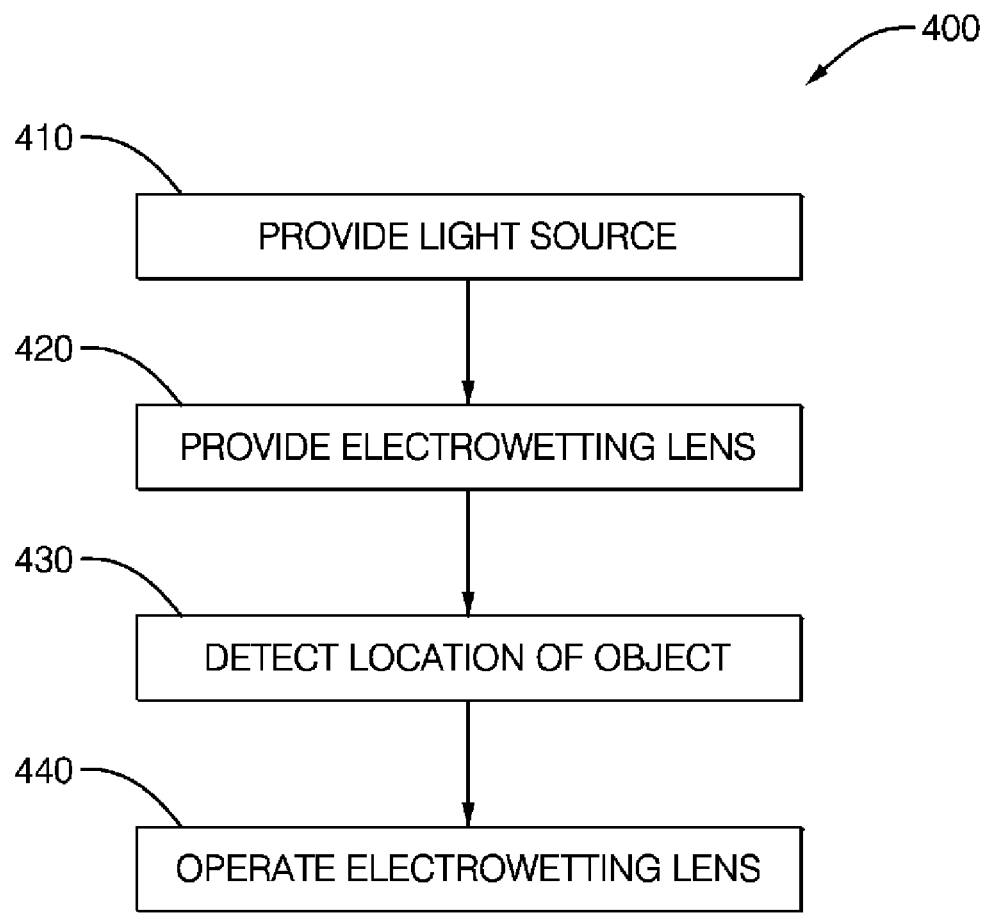
FIG. 4 is a flow chart of a method for controlling light distribution.

FIG. 4 illustrates a method 400 for controlling a light distribution pattern.

Step 410, PROVIDE LIGHT SOURCE, may include providing a light source 12 operable to emit light. For example, an array of light emitting diodes (LEDs) may be provided to emit light, and each individual LED may be independently operable for light intensity and/or color by each LED having a red light emittting element, a blue light emitting element, and a green light emitting element, or each LED having a white light emitting element and a red light emitting element.

Step 420, PROVIDE ELECTROWETTING LENS, may include providing an electrowetting lens 20 to vary a distribution pattern of light from the light source arriving in an area. For example the electrowetting lens 20 may be formed of individual electrowetting prisms 30A, 30B, 30C independently operable to direct light from the independent light sources 12A, 12B, 12C in distinct directions Step 430, DETECT LOCATION OF OBJECT, may include detecting a location of an object with an object detector 40, for example a camera configured to output a detection signal 96 to the controller 16. Step 430 may also include the controller 16 processing the detection signal 96 using known image analysis techniques to identify the presence of an object 42.

Step 440, OPERATE ELECTROWETTING LENS, may include operating the electrowetting lens 20 in order to control the light distribution pattern in the area 24 based on the location of the object 42 indicated by the object detector 40. Step 440 may also include the controller determining a control signal 92 for operating the electrowetting lens 20 to illuminate the object 42.

Accordingly, a system 10 for controlling a light distribution pattern, a controller 16 for the system 10 and a method 400 for controlling a light distribution pattern is provided. A system 10 equipped with an electrowetting lens 20 is able to change the light distribution pattern projected by the system 10 faster than a system that relies on mechanical devices to change the light distribution pattern. Also, the system 10 described herein makes better use of light emitted by the light source 12 by adjusting the intensity and location of the light distribution pattern for optimum illumination.

While this invention has been described in terms of the preferred embodiments thereof, it is not intended to be so limited, but rather only to the extent set forth in the claims that follow.

We claim:

1. A system for controlling a light distribution pattern, said system comprising:
    a light source operable to emit light;
    an electrowetting lens operable to vary a light distribution pattern of light from the light source into an area;
    an object detector configured to indicate a location of an object; and
    a controller configured to operate the electrowetting lens in order to control the light distribution pattern into the area based on the location of the object indicated by the object detector,
        wherein the electrowetting lens comprises a plurality of electrowetting prisms, and the light source comprises a plurality of distinct light sources, and each of the electrowetting prisms is associated with a particular light source such that light emitted by the particular light source is directed toward a particular electrowetting prism.

2. The system in accordance with claim 1, wherein the light source and the electrowetting lens form a lamp for a building structure.

3. The system in accordance with claim 1, wherein the light source and the electrowetting lens form a headlight for a vehicle.

4. The system in accordance with claim 1, wherein the controller is further configured to determine if the object is moving toward the area.

5. The system in accordance with claim 1, wherein the controller is further configured to operate the electrowetting lens in order to direct light toward the object.

6. The system in accordance with claim 1, wherein each light source comprises of one or more light emitting diodes.

7. The system in accordance with claim 1, wherein the object detector is an optical device, and the controller is configured to adjust the light distribution pattern based on an illumination level on the object.

* * * * *